No. 821,702. PATENTED MAY 29, 1906.
R. CONRAD.
BALL BEARING.
APPLICATION FILED AUG. 13, 1904.

WITNESSES:
Fred White
René Bruine

INVENTOR:
Robert Conrad,
By his Attorneys:
Arthur E. Frasert Co.

UNITED STATES PATENT OFFICE.

ROBERT CONRAD, OF BERLIN, GERMANY.

BALL-BEARING.

No. 821,702. Specification of Letters Patent. Patented May 29, 1906.

Application filed August 13, 1904. Serial No. 220,653.

*To all whom it may concern:*

Be it known that I, ROBERT CONRAD, engineer, a subject of the German Emperor, residing at 248 Kurfürstendam, Berlin, in the Empire of Germany, have invented certain new and useful Improvements in Ball-Bearings, of which the following is a specification.

This invention relates to all kinds of ball-bearings which are provided with partition devices or "cages" for keeping the balls apart. It deals, however, more especially with ball-bearings of that class in which a number of independent partition devices are located between the balls of the bearings. These partition devices, which may be rigid or may possess more or less elastic qualities, may be divided into two classes—that is to say, partition devices with an exposed running-surface and such devices with a covered running-surface.

This invention has for its object to improve the last-mentioned devices and also those which are specially provided at the parts adjacent to the balls with lateral plates, caps, capsules, or the like, with a view to preventing the injurious effects of the breaking of the balls and at the same time also to diminishing any friction that may occur.

A further purpose of the present invention is to protect the ball-bearings against the wearing out of the parts between the partition devices and the running-surface, but particularly that of the parts between such devices and the balls themselves. As regards this wearing out, ball-bearings provided with partition devices are more liable to be affected than ball-bearings having their running-surface completely filled up with balls.

Now the principal feature of this invention is that the partition devices having a covered running-surface are each converted into an independent lubricating device—such, for instance, as oil vessel or retainer—either by making use of capillary or absorbent wicks or the like carried by such devices or by employing a lubricant of a certain consistency, which is introduced into the said partition devices. Thus as many revolving lubricating devices are formed as there are balls employed, inasmuch as a partition device is always placed between two adjacent balls.

The accompanying drawings illustrate the application of the invention to a ball-bearing.

Figure 1:
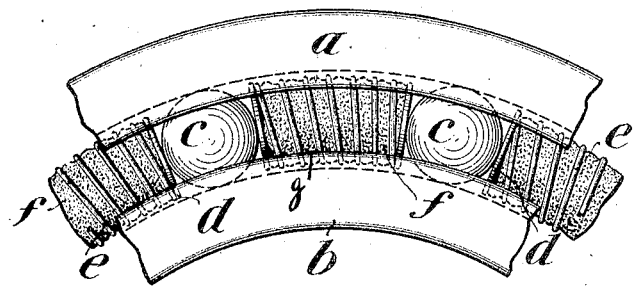
Figure 2:
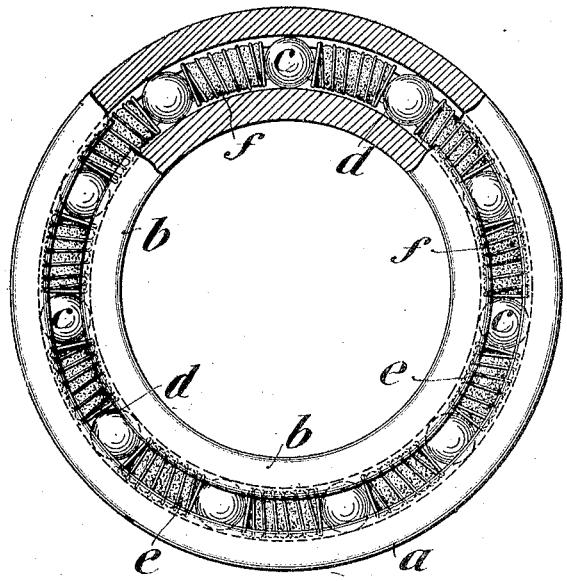

Figure 1 shows in side elevation a fragment of a complete bearing with lubricating devices intermediate between the balls, such devices carrying bodies of suitable material soaked in oil or grease. Fig. 2 shows in side elevation and partly in section a complete bearing.

In the example illustrated, the bearing comprises an interior ring $b$, an exterior ring $a$, and intermediate balls $c$. The lubricating devices here shown each includes a body of absorbent material charged with oil or grease, such body being carried in a surrounding wire spiral $e$, having at its extremities plates $d$. Any other construction may be provided. These lubricating devices may be employed in several ways. For instance, they may be used for the regular lubrication of the ball-bearings, in which case they may be charged with oil by immersing their bottom part, while in motion, if desired, at certain intervals—for example, every fortnight—for a short time into an oil-bath, by which means the wicks or other equivalent absorbent materials are impregnated or saturated with oil, and after removal from the oil-bath said materials would, little by little, supply the running-surface with drops of oil passing through a small aperture in the protecting-cover.

Instead of immersing the bearings in oil, it would be quite as effective to saturate the partition devices with oil by means of an oil-can or by making use of any other method of impregnation.

The aforesaid arrangement has the great advantage, among others, that no oil is wasted, as has hitherto been the case in ball-bearings of the old construction, and also that the continual beating of the oil by the balls and the partition devices common to the lubricating method usually employed, and which finally destroys completely, or nearly so, its lubricating qualities, is effectually prevented. On the other hand, however, it may be desired when employing other suitable methods of lubrication which permanently supply the bearings with oil to utilize the lubricant stored up in the lubricating devices only when for any reason the lubrication proper fails to work. In this case when the regular supply of oil fails the oil retained by the lubricating devices will for a long time keep the bearings in good lubricated order.

My improved devices may be suitably inclosed, if desired, in which case openings should be left for the egress of the lubricant.

It is immaterial whether the central part of the lubricating device is rigid or elastic; nor does it make any difference if the absorbent wick or any other suitable oil-storing material is inserted into the hollow space of said partition device, or if, for instance, both the end plates of the running-surface are connected with one another by a bar or by means of a closely-coiled spiral spring over which the wick may be drawn. The spaces g between the convolutions of the spring serve to release the oil when necessary. It is, however, very important, especially where the devices are only used as a spare lubricating means, that a lubricant of more or less solid consistency and having a suitably-high melting-point should be stored in said devices. In this case, as long as the regular supply of lubricant and the temperature of the parts is normal, the spare lubricant in the partition devices will either not be brought into use at all or it will only be used to a limited extent. When, however, the ordinary lubricant fails to work properly and the temperature of the parts therefore rises, the solid lubricant stored in the partition devices will become more or less fluid, and thus be capable of supplying for a long space of time the required lubricant, and the bearings will thus be kept in proper working order.

Having now particularly described and ascertained the nature of the said invention and in what manner the same is to be performed, I declare that what I claim is—

1. In a ball-bearing, a yielding lubricating device interposed between adjacent balls, said balls being free to move toward each other and to compress the lubricating device between them.

2. In a ball-bearing, a lubricating device interposed between adjacent balls, said device having a pair of end plates movable toward and from each other, and a lubricating material carried between said plates.

3. In a ball-bearing, a lubricating device interposed between adjacent balls, said device having a pair of end plates, a yielding connection between such plates, and a lubricating material carried by said connection.

4. In a ball-bearing, a lubricating device interposed between adjacent balls, said device having a pair of end plates, a spring between such plates, and a lubricating material carried by said spring connection.

5. In a ball-bearing, a lubricating device interposed between adjacent balls, said device having a pair of end plates inclosing a lubricating material and having provisions for releasing the lubricating material from the space between said end plates to the inner raceway.

ROBERT CONRAD.

Witnesses:
  WOLDEMAR HAUPT,
  HENRY HASPER.